C. L. Stacy,
Hydrant.
No. 1,985. Reissued June 6, 1865.
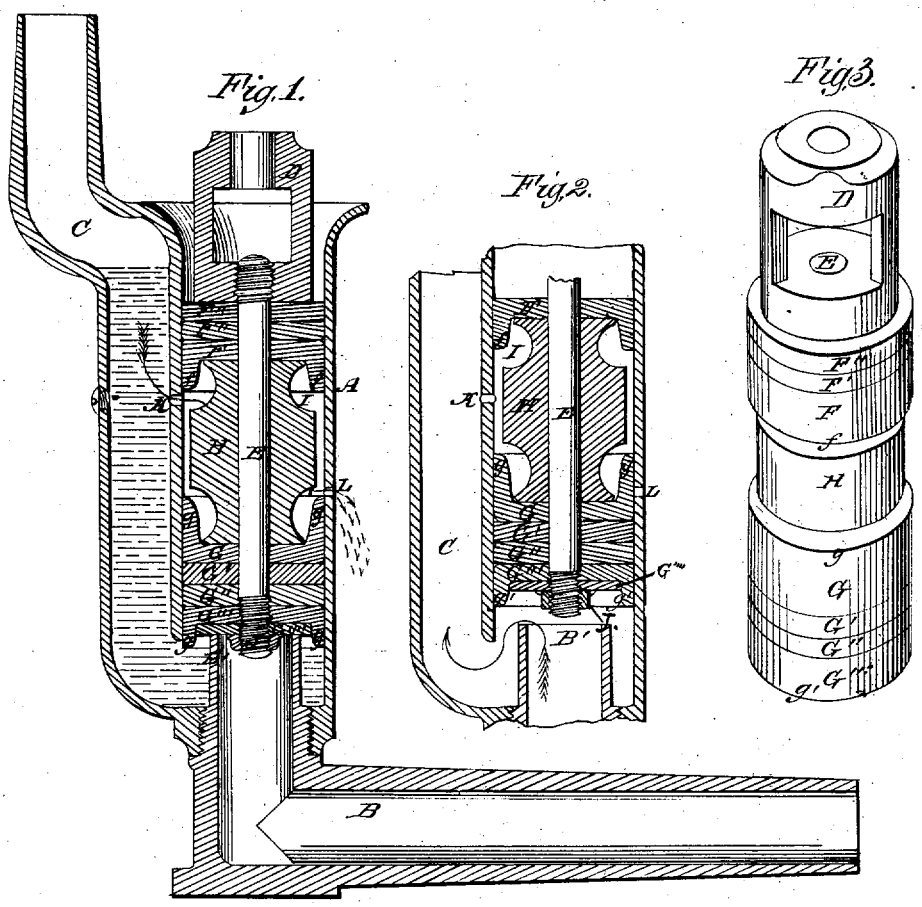
Witnesses.
G. H. Knight.
John A. Stacy.
Inventor:
Charles L. Stacy
N. PETERS, PHOTO-LITHOGRAPHER, WASHINGTON, D. C.

UNITED STATES PATENT OFFICE.

CHARLES L. STACY, OF CINCINNATI, OHIO.

IMPROVEMENT IN HYDRANTS.

Specification forming part of Letters Patent No. 25,683, dated October 4, 1859; Reissue No. 1,985, dated June 6, 1865.

*To all whom it may concern:*

Be it known that I, CHARLES L. STACY, of Cincinnati, Hamilton county, Ohio, have invented a certain new and useful Improvement in Hydrants; and I do hereby declare the following to be a full, clear, and exact description thereof, reference being had to the accompanying drawings, making part of this specification.

My invention relates to the class of hydrants which contain a provision for emptying the discharge-pipe whenever the hydrant is closed; and my invention consists in an arrangement whereby the back pressure of the column of water on the delivery side is made available to automatically close the wasteway or drip-hole.

Figure 1 is an axial section of the hydrant when closed. Fig. 2 is an axial section representing the hydrant in the act of discharging water and having its wasteway closed. Fig. 3 is a perspective view of the plunger.

A is the hydrant-cylinder.

B and C are the service and discharging pipes, respectively.

The upper end, B′, of the pipe B serves as a valve-seat.

My plunger is composed of an upper piston consisting of leather disks F F′ F″ and a lower piston composed of leather disks G G′ G″ G‴, said pistons being separated by a sleeve, H, so as to inclose an annular chamber, I. The above parts of the plunger are all secured upon a central stem, E, by means of nuts D and J and washer G⁗. The nut D serves as the coupling or attachment of the plunger-rod. The washer G⁗ is of leather, and serves the purpose of a valve to close the seat B′.

The disks F, G, and G‴ have the represented cup form, the lips *f* and *g* being presented inward or toward the annular chamber I, and the lip *g′* being presented in the direction opposed to the flow of surface water. The sleeve H may be bulged at middle, so as to reduce the size of the annular chamber I, and by that means to lessen the amount of water wasted in working hydrants of this class.

K is a small hole connecting the discharge-pipe C with the annular chamber I, and enabling the water contained within said chamber to act in concert with that outside of said chamber in expanding or pressing outward against the sides of the cylinder A the lips *f g g′* of the piston-cups F G G‴, so as to prevent the wastage of water during the act of discharging either by way of the drip-hole or out through the mouth of the cylinder A.

The waste-hole or "drip" L is located at such a height in the cylinder A as to be just clear of the cup G when the hydrant is closed, thus affording a wasteway or ventage for any water that may then be left either in the pipe C or chamber I.

The elevation of the plunger in the operation of opening the hydrant acts to instantly cover the drip L by the cup G, as seen in Fig. 2, while the lips *f*, *g*, and *g′*, being at the same time pressed snugly against the sides of the cylinder A by the head of water, entirely prevent any wastage either through the aperture L or out through the top of the cylinder.

It will be seen that the plunger may be withdrawn from the cylinder A at any time without disturbing the other parts of the hydrant.

I have selected for illustration an embodiment of my invention, which practical test has proved to be effective, but do not desire to restrict the improvement to the precise forms or materials herein described, as various modifications are obviously practicable whereby the back pressure of the discharging-column may be made available to close the waste-hole—for example, india-rubber may take the place of leather for the cup-pistons and the latter may close by contraction upon a waste way situated within them.

I claim herein as new and of my invention—

1. The provision in a hydrant-piston of a flexible cup, G, or its described equivalent, so arranged as to cover the waste aperture in the act of drawing, and to be pressed against said aperature by the head of water in the discharge-pipe, substantially as set forth.

2. The relative arrangement of the cup-formed disks F, G, and G''' and the apertures K and L, adapted in the manner set forth, to form a chamber, I, closed on all sides, with the exception of the ingress-aperture K, while the hydrant is open, substantially as set forth.

In testimony of which invention I hereunto set my hand.

CHAS. L. STACY.

Witnesses:

GEO. H. KNIGHT,
JAMES H. LAYMAN.